United States Patent
Saad et al.

(10) Patent No.: US 10,833,976 B2
(45) Date of Patent: *Nov. 10, 2020

(54) LOOP DETECTION AND AVOIDANCE FOR SEGMENT ROUTED TRAFFIC ENGINEERED PATHS

(71) Applicant: Cisco Technology, Inc., San Jose, CA (US)

(72) Inventors: Tarek Saad, Nepean (CA); Clarence Filsfils, Brussels (BE); Muthurajah Sivabalan, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,239

(22) Filed: Nov. 9, 2018

(65) Prior Publication Data

US 2019/0081887 A1    Mar. 14, 2019

Related U.S. Application Data

(63) Continuation of application No. 15/227,721, filed on Aug. 3, 2016, now Pat. No. 10,182,000.

(51) Int. Cl.
*H04L 12/707* (2013.01)
*H04L 12/24* (2006.01)
*H04L 12/751* (2013.01)
*H04L 12/721* (2013.01)
(Continued)

(52) U.S. Cl.
CPC .......... *H04L 45/22* (2013.01); *H04L 12/4633* (2013.01); *H04L 45/12* (2013.01); *H04L 47/22* (2013.01)

(58) Field of Classification Search
CPC .......... H04L 45/22; H04L 47/22; H04L 45/12; H04L 12/4633
See application file for complete search history.

(56) References Cited

U.S. PATENT DOCUMENTS

| | | | |
|---|---|---|---|
| 2006/0171320 A1* | 8/2006 | Vasseur | H04L 45/02 370/238 |
| 2007/0174483 A1 | 7/2007 | Raj et al. | |
| 2012/0213228 A1 | 8/2012 | Scholl | |

(Continued)

OTHER PUBLICATIONS

Sivabalan, S., et al., "PCEP Extensions for Segment Routing," Network Working Group Internet Draft, Jul. 3, 2014, 18 pages; https://tools.ietf.org/pdf/draft-sivabalan-pce-segment-routing-03.pdf.

(Continued)

*Primary Examiner* — Kiet Tang

(57) ABSTRACT

A method is described and in one embodiment includes receiving a packet of a traffic flow at an ingress node of a communications network; routing the packet to an egress node of the communications network via a first path comprising a tunnel if the packet was received from a node external to the communications network; and routing the packet to the egress node of the communications network via a second path that does not traverse the tunnel if the packet was received from a node internal to the communications network. The first path is identified by a first Forwarding Information Base ("FIB") entry corresponding to the flow and the second path is identified by a second FIB entry corresponding to the flow.

20 Claims, 7 Drawing Sheets

(51) Int. Cl.
*H04L 12/46* (2006.01)
*H04L 12/815* (2013.01)

(56) References Cited

U.S. PATENT DOCUMENTS

| | | |
|---|---|---|
| 2013/0182574 A1 | 7/2013 | So et al. |
| 2014/0286155 A1* | 9/2014 | Bashandy ........... H04L 41/0663 370/221 |
| 2015/0103844 A1* | 4/2015 | Zhao ....................... H04L 45/42 370/410 |
| 2015/0381406 A1 | 12/2015 | Francois et al. |
| 2018/0041420 A1 | 2/2018 | Saad et al. |

OTHER PUBLICATIONS

Shand., M., et al., "A Framework for Loop-Free Convergence," Internet Engineering Task Force (IETF), RFC 5715, Jan. 2010, 22 pages; https://tools.ietf.org/pdf/rfc5715.pdf.
Filsfils, C., et al., "Segment Routing Architecture," Network Working Group, Oct. 21, 2013, 28 pages; https://tools.ietf.org/pdf/draft-filsfils-rtgwg-segment-routing-01.pdf.

* cited by examiner

| SEGMENT | NEXT-HOP | SR HEADER OPERATION |
|---------|----------|---------------------|
| Sk | M | CONTINUE |
| Sj | N | NEXT |
| Sl | NAT SRVC | NEXT |
| Sm | FW SRVC | NEXT |
| Sn | Q | NEXT |

LOOP DETECTION AND AVOIDANCE FOR SEGMENT ROUTED TRAFFIC ENGINEERED PATHS

CROSS-REFERENCE TO RELATED APPLICATION

This application is a continuation of U.S. application Ser. No. 15/227,721, filed Aug. 3, 2016, the entirety of which is incorporated herein by reference.

TECHNICAL FIELD

This disclosure relates in general to the field of communications networks and, more particularly, to techniques for loop detection and avoidance for segment routed traffic engineered paths.

BACKGROUND

Segment Routing ("SR") allows for a flexible definition of end-to-end paths by encoding paths as sequences of topological sub-paths, or "segments," which are exchanged using routing protocols (e.g., IS-IS and OSPF or BGP). Two types of segments are defined, including "prefix segments" and "adjacency segments." A prefix segment represents an Equal Cost Multi-Path ("ECMP") aware shortest-path to a prefix, e.g. as per the state of the IGP topology. An adjacency segment represents a hop over a specific adjacency between two nodes. An SR control plane may be applied to both IPv6 and MPLS data-planes. In segment routing ("SR"), a node steers a packet through a controlled set of "segments," by prepending the packet with an SR header. A segment can represent any instruction, whether it be topological or service-based. SR enables a flow to be enforced through any topological path and/or service chain, while maintaining a per-flow state only at the ingress node to the SR domain. The SR architecture may be applied directly to a Multi-Protocol Label Switching ("MPLS") dataplane with no change on the forwarding plane. Interior Gateway Protocol ("IGP") based segments require minor extensions to the existing link-state routing protocols.

Under certain conditions, an SR packet whose active prefix segment is consumed at a node X can potentially present itself back at the same node X. Such "looping" of packets may occur due to misconfiguration of a routing table at a downstream node or after a network topology change event followed by a slow convergence of the routing protocol on nodes along the packet path. SR allows a node to steer traffic onto a specific traffic engineered path (i.e., an SR-TE path or tunnel) by prepending packets with a list of segments that define the path. An incoming packet that is routed over an SR-TE tunnel is prepended with the segment list representing the TE path; however, under certain conditions, the list of selected segments that define the underlying paths can result packets endlessly looping between the headend node, or router, and a downstream node, or router. Under such conditions, packets steered over the SR-TE path never reach their intended destination, while network resources between the headend node and the downstream looping node are continuously consumed in the process.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

A method is described and in one embodiment includes receiving a packet of a traffic flow at an ingress node of a communications network; routing the packet to an egress node of the communications network via a first path comprising a tunnel if the packet was received from a node external to the communications network; and routing the packet to the egress node of the communications network via a second path that does not traverse the tunnel if the packet was received from a node internal to the communications network. The first path is identified by a first Forwarding Information Base ("FIB") entry corresponding to the flow and the second path is identified by a second FIB entry corresponding to the flow.

EXAMPLE EMBODIMENTS

Segment Routing ("SR") is a mechanism by which a packet may be forwarded using SR forwarding tables and segment identifiers ("SIDs") attached to packets. Like MPLS, SR enables very fast and simple forwarding engines in the data plane of nodes that employ SR ("SR nodes"). For example, packets may enter an SR-enabled provider network via an ingress provider edge ("PE") node, travel hop-by-hop along a segment-switched path ("SSP") that includes one or more core nodes, and exit the provider network via an egress PE node. Much of the remaining description will be provided with reference to an autonomous, provider network that operates under one administrative domain; however, it will be understood that SR may be employed over multiple administrative domains as well. In general a provider network may contain a contiguous set of nodes.

In some embodiments, SIDs are relatively short, fixed-length identifiers. SIDs may correspond to topological segments of a provider network or services provided by network nodes. Topological segments can be one hop paths to SR nodes, or they can be multi-hop paths to SR nodes. Topological segments act as sub-paths that can be combined to form an SSP. Stacks of SIDs can represent SSPs, as will be described below.

Figure 1:
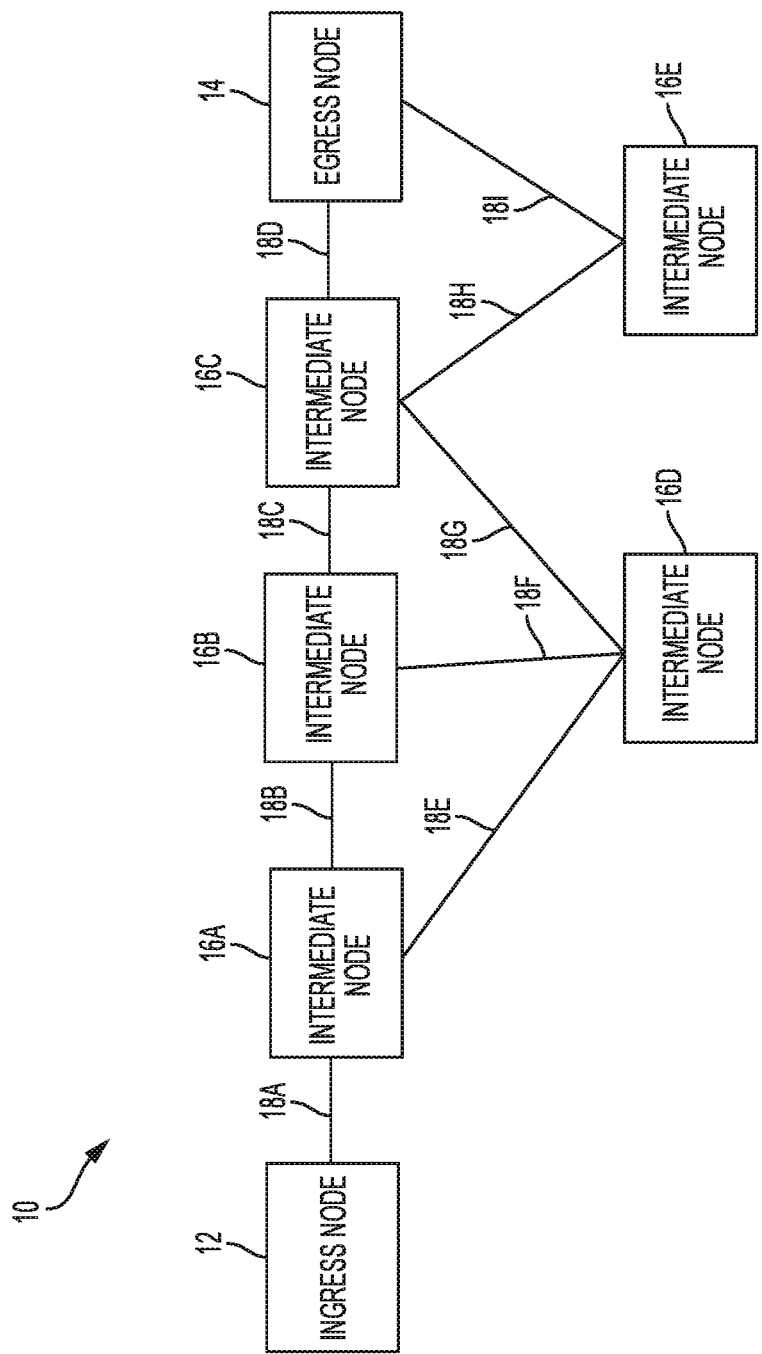
FIG. 1 is a simplified block diagram of an example SR domain in which a system for supporting loop detection and avoidance for SR-TE paths may be implemented in accordance with embodiments described herein.
Figures 2, 3:
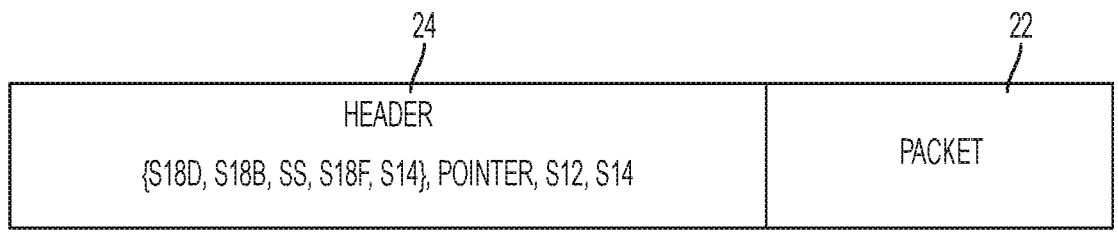
FIG. 2 is a simplified illustration of a packet having an SR header that may be deployed in a system for supporting loop detection and avoidance for SR-TE paths may be implemented in accordance with embodiments described herein.
FIG. 3 illustrates a Segment Routing Database ("SRDB") that may be deployed in a system for supporting loop detection and avoidance for SR-TE paths may be implemented in accordance with embodiments described herein.

Referring to FIG. 1, illustrated therein is an SR domain 10 in which a system for supporting loop detection and avoidance for SR-TE paths may be implemented in accordance with embodiments described herein. The SR domain 10 includes an ingress node 12, an egress node 14, and a plurality of intermediate nodes 16A-16E interconnected by a plurality of links 18A-18I. It will be assumed for the sake of example that all of the links 18A-18I have the same IGP cost. It will be further assumed that a packet enters the SR domain 10 at the ingress node 12, exits the SR domain at the egress node 14, and that the following requirements must be met. A local service offered by intermediate node 16B must be applied to the packet; links 18B and 18D cannot be used to transport the packet; any intermediate node 16A-16E should be able to determine where the packet entered the domain 10 and where it will exit the domain, as well as the path from the ingress node to itself and from itself to the egress node. Additionally, per-flow state for the packet should only be created at the ingress node 12 and the domain operator may forbid anyone outside the domain from exploiting its intra-domain SR capabilities. Referring to FIG. 2, all of the aforementioned requirements may be realized by instructing the ingress node 12 to push onto the packet (illustrated in FIG. 2 as a packet 22) an SR header (illustrated in FIG. 2 as an SR header 24) containing a source route encoded as a list of SIDs for the segments comprising the path {S16D, S16B, SS, S16E, S14}, a pointer, and an identification of the ingress node (S12) and egress node (S14).

As previously noted, in certain embodiments, an SID is a 32-bit ID for either a topological instruction or a service instruction. A segment can be either global or local. An instruction associated with a global segment is recognized and executed by any SR-capable node within the domain. An instruction associated with a local segment is supported only by the specific node that originates it. Assuming that, within the domain 10, a "node segment" is defined as a global instruction to forward a packet along the shortest path to the specified node; segments S12, S16D, S16B, S14, and S16E identify IGP node segments to nodes 12, 16D, 16B, 14, and 16E, respectively; and node B identifies its local service S with a local segment SS, the journey of the packet 22 may be described as follows. First, the packet 22 reaches the ingress node 12, which pushes the SR header 24 on to the packet and sets the pointer to the first segment of the segment list (i.e., S16D). As previously noted, S16D is an instruction recognized by all of the nodes in the domain 10 to forward the packet along the shortest path to the node 16D. When the packet arrives at node 16D, the pointer is incremented and the next segment (S16B) is executed. Segment S16B is an instruction recognized by all of the nodes in the domain 10 to forward the packet along the shortest path to the node 16B. When the packet arrives at the node 16B, the pointer is incremented and the next segment (SS) is executed. As previously noted, segment SS is an instruction recognized only by node 16B that causes the service S to be applied to the packet. Once the service S has completed, the pointer is incremented and the next segment (S16E) is executed. As previously noted, S16E is an instruction recognized by all of the nodes in the domain 10 to forward the packet along the shortest path to the node 16E. When the packet arrives at node 16E, the pointer is incremented and the next segment (S14) is executed. S14 is an instruction recognized by all of the nodes in the domain 10 to forward the packet along the shortest path to the node 14. The node 14 (which is the egress node) removes the SR header and the packet continues its journey outside the domain 10.

As illustrated in and described with reference to FIGS. 1 and 2, and set forth in the example requirements, any node along the packet path is able to identify the service and topological journey of the packet within the domain 10. Additionally, only the ingress node 12 maintains per-flow state for the packet. The entire program of topological and service instructions to be executed by the domain 10 on the packet 22 is encoded by the ingress node 12 in the SR header 24 in the form of the list of segments. No further per-flow state is required along the packet path; the state is encoded in the SR header 24 and travels with the packet 22. Intermediate nodes only hold states related to the global node segments and the local adjacency segments, which are not flow specific and therefore scale well. Finally, the SR header is inserted at the entrance to the domain 10 (i.e., ingress node 12) and removed at the exit from the domain (i.e., egress node 14); therefore the operator can forbid anyone outside the domain 10 to utilize its intra-domain SR capability.

An SR TE policy is composed of two elements, including a flow classification and a segment list to prepend on packets of the flow. In the SR architecture, the per-flow state only exists at the ingress node, or edge router, where the policy defined and the SR header is pushed onto packets of the flow. A stateful PCE server that desires to instantiate at a node an SR-TE policy collects the SR capability of the node so as to insure that the policy meets the node's capability.

A Segment Routing Database ("SRDB") is a database comprising a set of entries each of which is identified by a segment value. The instruction associated with each entry at least defines the identity of the net how to which the packet should be forwarded and what operation should be performed on the SR header. Header operations include PUSH (an SR header is pushed onto an IP packet or additional segments are added at the head of the segment list and the pointer is moved to the first entry of the added segments), NEXT (the active segment is completed and the pointer is moved to the next segment in the list), and CONTINUE (the active segment is not completed and the pointer is left unchanged). As used herein, "active segment" refers to the segment to which the pointer is currently pointing in the segment list set forth in the SR header. FIG. 3 illustrates an example SRDB, designated in FIG. 3 by a reference numeral 30. Each SR-capable node maintains its own local SRDB. SRDP entries may either derive from local policy or from protocol segment advertising.

Figure 4:
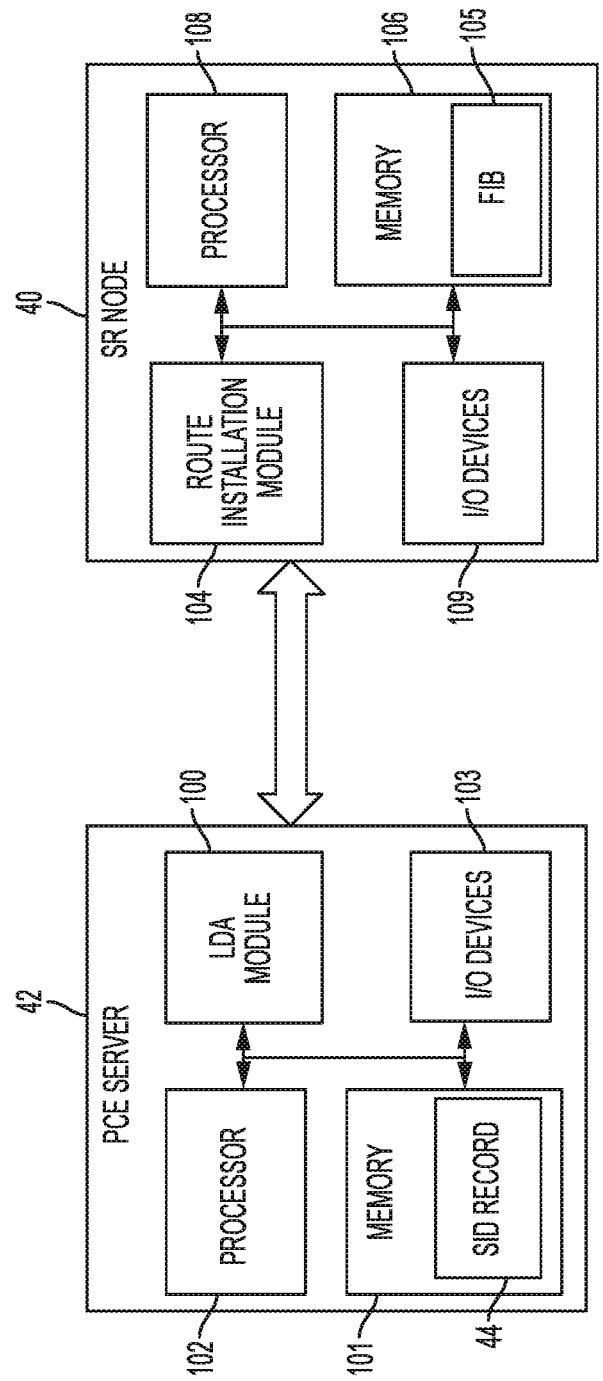
FIG. 4 is simplified block diagram of a portion of an example SR domain comprising an SR node and a Path Computation Element ("PCE") server that may be deployed in a system for supporting loop detection and avoidance for SR-TE paths may be implemented in accordance with embodiments described herein.

There are several types of SIDs, including but not limited to, node-SIDs and adjacency-SIDs. A node-SID represents a one-hop or a multi-hop path within the provider network to an associated SR node. A node-SID is assigned to an individual SR node, or SR router, within the SR domain/provider network. In one embodiment, all assigned node- SIDs are selected from a predefined ID range (e.g., [64, 5000]) for the provider network. The range for node-SIDs may be different from a predefined range for labels. As shown in FIG. 4, node-SIDs may be assigned to SR nodes, such as an SR node 40, by a path computation element ("PCE") server, such as PCE server 42. Referring to FIG. 4, when the SR node 40, the node may send a query to the PCE server 42 requesting a node-SID be assigned. In response, the PCE server may respond with an appropriate node-SID from the predefined ID range. The PCE server 42 may maintain a record 44 (e.g., in a data structure in memory, in a file on a hard drive, etc.) indicating which nodes have been assigned node-SIDs. If the requesting SR node 40 has not already been assigned a node-SID, the PCE server 42 can select an unused ID from the ID range, send a response containing the selected ID, and update the record 44 to show that the requesting node has been assigned the selected ID. If the requesting SR node 40 has already been assigned a node-SID, the PCE server 42 can access the record 44 to obtain the previously-assigned node-SID and return that SID to the requesting SR node.

Alternatively, rather than sending node-SIDs in response to requests from SR nodes, the PCE server can instead identify that a newly-booted SR node needs a node-SID and assign (and send) that SR node a node-SID without having received a request from that SR node. Similarly, a PCE server can identify that an SR node that already has one or more assigned node-SIDs needs a new node-SID (in order to provide an alternative path to that SR node) and can thus similarly proactively assign and send the SR node an additional node-SID.

The SR nodes can map their respectively assigned node-SIDs in memory to unique identifiers. For purposes of explanation only, node-SIDs are mapped to respective node loopback prefix IP addresses. One of ordinary skill understands that node loopback prefix IP addresses (node prefixes for short) distinguish the SR nodes from each other within the provider network. The node prefixes can be used by link state protocols such as open shortest path first ("OSPF"), intermediate system to intermediate system ("IS-IS"), or modifications thereof, operating in the control plane of an SR node to identify egress interfaces for paths to respective SR nodes. Once identified, the appropriate egress interfaces for the paths can be mapped to node-SIDs within an SR forwarding table as the SR forwarding table is created or subsequently updated.

In some embodiments, the link state protocols can calculate paths to SR nodes using a variety of different algorithms. A default path-calculation algorithm (e.g., a Dijkstra shortest path rooted at the SR node to which the path leads) may be used if no specific algorithm is specified; if an algorithm is specified for a particular path, however, all SR nodes will use the same specific algorithm when calculating that path. As described above, each SR node uses the path calculation in order to identify the appropriate egress interface to add to its SR forwarding table for a given node-SID.

In some embodiments, it may be desirable, from a TE standpoint, for there to be two (or more) different nodal segments leading to the same SR node. In such embodiments, that SR node can be assigned two different node-SIDs (e.g., each of which can then be mapped to a different node prefix). In these situations, the distinct paths are each calculated using a different algorithm. Accordingly, another node can include multiple node-SIDs for segments leading to the same SR node in its SR forwarding table, but each of these node-SIDs may be associated with a different egress interface, which is identified using the specific algorithm used to calculate the respective nodal segment identified by each node-SID.

An adjacency ID corresponds to a link between adjacent SR nodes. For purposes of explanation only, the phrase "adjacency segment" (or simply "adjacency") may be used to refer to a link between nodes. Adjacencies can be uniquely identified in the provider network. For purposes of explanation only, adjacencies is identified herein using the node prefixes of nodes between which the adjacency is immediately positioned. For example, an adjacency between two nodes identified by node prefix X and node prefix Y, respectively, will be identified by adjacency ID XY. It will be assumed for the sake of discussion herein that only one adjacency exists between nodes in the provider network, it being understood the present disclosure should not be limited thereto. As such, adjacencies are unique in the provider network of this disclosure. Since adjacencies are unique, it follows that adjacency IDs are likewise unique. Adjacency IDs should not be confused with adjacency-SIDs; adjacency-SIDs may not be unique within the provider network domain.

Each SR node can assign a distinct adjacency-SID for each of the SR node's adjacencies. Adjacency-SIDs are locally significant; separate SR nodes may assign the same adjacency-SID, but that adjacency-SID represents distinct adjacencies. In one embodiment, adjacency-SIDs are selected from a predefined range that is outside the predefined range for node-SIDs. The predefined range of adjacency-SIDs may also be outside the predefined range for labels. SR nodes may advertise their node-SIDs, adjacency-SIDs, and node prefixes to other SR nodes in the provider network using a protocol such as IGP or a modification thereof. SR nodes can use the node-SIDs, adjacency-SIDs, node prefixes, and/or other information to create or update SR forwarding tables and/or SID stacks.

In one embodiment the SR nodes can advertise their node-SID/node prefix pairs, adjacency-SID/adjacency ID pairs, and/or the like. The control planes of an SR node can receive and use the node-SID/node prefix pairs and a link-state protocol such as IS-IS or OSPF, or modified versions thereof, to identify egress interfaces for paths to SR nodes, using the appropriate algorithms identified (if any) in the advertisements of the nodal segment to those SR nodes or a default algorithm (e.g., a Dijkstra shortest path rooted at the appropriate SR node). An egress interface, once identified, can be mapped to its respective node-SID in the node's SR forwarding table.

SR Nodes also map their adjacency-SIDs to egress interfaces for respective adjacencies in SR forwarding tables. Because adjacency-SIDs are locally significant, however, adjacency-SIDs should only be mapped in SR forwarding tables of the nodes that advertise the adjacency-SIDs. In other words, an SR node that advertises an adjacency-SID/adjacency ID pair should be the only node in the provider network that has a SR forwarding table that maps the adjacency-SID to an egress interface connected to an adjacency identified by the adjacency ID.

In one embodiment, SR nodes may use a sub-type-length-value ("sub-TLV") in an IS-IS protocol link state packet to advertise IDs. This sub-TLV can include information identifying the ID being advertised, as well as the type of SID (e.g., node-SID, adjacency-SID, or the like). The sub-TLV can also include information (e.g., in the form of a flag) for node-SIDs that indicates how to calculate the path identified by that node-SID. Information that identifies the path associated with the advertised ID in terms of a hop list or SR stack may also be included. In some embodiments, the sub-TLV may also include information identifying the domain to which the ID belongs and/or that the ID is being linked (via redistribution) to another SID within a different domain. The sub-TLV can be part of a larger TLV within the link state packet.

SR enables creation of segment-switched paths ("SSPs"), which can be used for transporting packets through the provider network. Like LSPs, SSPs are typically associated with Forwarding Equivalence Classes ("FECs"), and can be established for a variety of purposes, such as to guarantee a certain level of performance. Packets associated with the same FEC will typically follow the same SSP of SR nodes through the provider network. Nodes in SSPs make forwarding decisions based on SIDs, not based on the contents (e.g., destination IP addresses) of packets. As such, packet forwarding in SSPs is not dependent on a particular Layer 2 technology.

SR nodes can use node-SIDs and adjacency-SIDs received in advertisements from other SR nodes to create ordered lists of SIDs (i.e., SID stacks). SID stacks correspond to SSPs, respectively, that forward packets between SR ingress and egress nodes in the provider network. SIDs in a stack may correspond to respective segments or sub-paths of a corresponding SSP. When an SR source node (e.g., an SR ingress PE node) receives a packet, the node can calculate a FEC for the packet in much the same way that LDP ingress PE nodes calculate FECs for packets received from a customer edge router. The SR source node uses the FEC it calculates to select a SID stack mapped thereto. The SR source node can add the selected SID stack to a header, and then attach the header to the packet. The packet with attached stack can traverse the segments of the SSP in an order that corresponds to the list order of the SIDs in the stack. A forwarding engine operating in the data plane of each SR node can use a SID within the stack and an SR forwarding table in order to forward the packet and header to the next node in the SSP. As the packet and attached header are forwarded along the SSP in a hop-by-hop fashion, the attached stack of SIDs remains unchanged in one embodiment.

When creating a segment stack to include in a header of packet to be routed via a network of SR nodes, an SR node can use any of the segments identified in its SR forwarding table. As described above, these segments can identify paths calculated using any of a variety of different algorithms, such that a given segment stack can identify segments calculated using different algorithms. For example, a segment stack listing SIDs A, B, D, E, F can include two paths (e.g., those identified by SIDs A and B) calculated using a first algorithm and another path (e.g., identified by SID E) calculated using an entirely different algorithm.

Segment stacks can be constructed in any manner needed for TE purposes. Additionally, a node can use any of the identified segments in its SR forwarding table to form a segment stack. Furthermore, a node may select bits and pieces of paths identified by different segments in order to create a segment stack. Thus, a node can combine different segments into a segment stack for a variety of reasons. One reason is to define a new path that is not explicitly defined by any existing segment. Thus, to get a packet from node A to node F, a segment stack created by node A can include one segment that goes to node B, and another segment that includes node B (but doesn't necessarily have to start with node B) and goes to node F. As noted above, these two segments can cover paths calculated using different algorithms.

Another reason for combining different segments is in order to reduce the number of SIDs in the stack. For example, a node can determine that a packet should be routed over a path that passes through six nodes ABCDEF in that order. While the node could use six adjacency segments to route the packet, the segment stack would need to include all six identifiers of those adjacency segments. As an alternative, the SR node can examine its forwarding table and determine that the nodal segment to node C includes nodes A and B, and that the nodal segment to node F includes nodes D and E. Based on these determinations, the SR node can simply include the nodal segment to C followed by the nodal segment to F in the segment stack, reducing the number of identifiers from six to two.

When steering packets onto SE-TR tunnels, it is possible that packets previously tunneled over the SR-TE tunnel loop back to the ingress node, at which point the ingress may route the packet back again on the same SR-TE tunnel, resulting in reimposing the full segment list on the same packet again. If this happens repeatedly, the segment stack may grow indefinitely and packets will continue to flow around the loop until their time-to-live ("TTL") expires and they are discarded. The steering of packets onto a TE tunnel usually happens using a static route whose outgoing path is a TE tunnel. Alternatively, the TE tunnel autoroute feature ("IGP shortcuts") allows the ingress node to automatically map prefixes whose shortest path (from the ingress node) traverses through the tunnel endpoint. In both cases, packets that are steered over an SR-TE tunnel may experience the loop scenarios described earlier and cause a complete black hole to the steered traffic.

Figure 5:
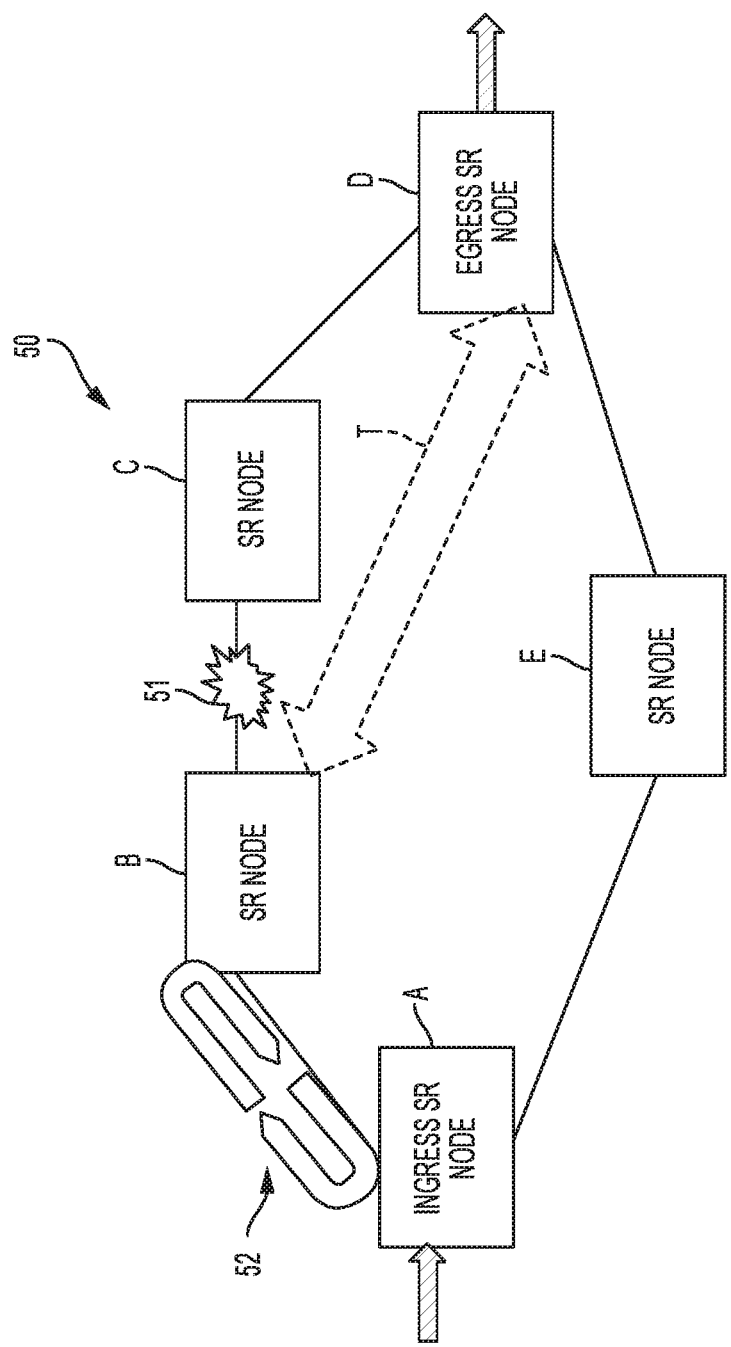
FIG. 5 is a simplified block diagram of an example SR domain illustrating a loop that may be detected by a system for supporting loop detection and avoidance for SR-TE paths may be implemented in accordance with embodiments described herein.

This loop scenario is illustrated in FIG. 5, which depicts an SR domain 50 in which an SR-TE tunnel T is created at a node A whose path is: T: {B, D}. A route R is installed on node A to route all external IP packets destined for node D via tunnel T (northbound) (R: route (D)->T). Packets to node D are imposed with the segment list {B, D} and forwarded on the shortest path to node B (northbound). If a link failure 51 occurs between node B and node C ("link B-C"), node B receives packets whose top segment is node D, processes the top segment D, and routes the packets westbound (counter-clockwise) toward node D, keeping the top segment D on the packet. As a result, packets arrive on node A with the top segment D. However, due to the route to node D installed on node A pointing to tunnel T, the packet is retunneled into tunnel T again. In such a case, packets continue looping between the ingress node A and node B (as indicated by a loop 52) while the packet's segment stack grows until the packet TTL expires.

In accordance with features of embodiments described herein, a mechanism is provided for detecting loops in the SR-TE selected path and for avoiding retunneling of looping packets onto the same SR-TE tunnel as described in connection with the above-scenario. In practice, external traffic arrives at a provider edge ("PE") node and gets classified to determine the respective service or tunnel on which to forward the customer traffic (e.g., low latency tunnel/service). Once an SR-TE tunnel is selected, the customer packets that are encapsulated over MPLS and the respective segment/label stack that defines the SR-TE path is imposed on the packets that are forwarded to the provide core network. To avoid the retunneling of packets that loop back to the tunnel ingress from the network core, in one embodiment the PE, or ingress, node installs two Forwarding Information Base ("FIB") entries for prefixes to be routed over the SR-TE tunnel in its FIB/forwarding. The first route services external customer traffic (e.g. IP-to-MPLS) destined to the prefix and points to the tunnel matching the classified service. The second route services transmit internal MPLS traffic (MPLS-to-MPLS), that potentially loops back from the network core to the tunnel ingress and whose path points to an IGP-computed physical path (no tunnel).

Figure 6:
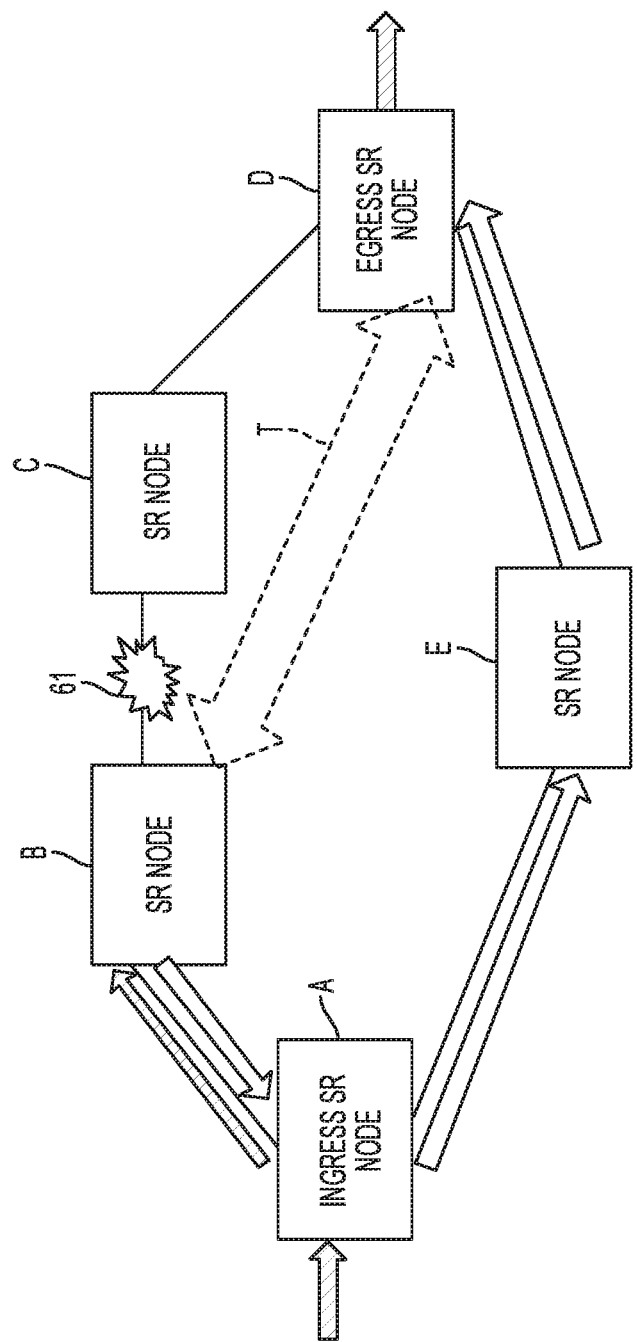
FIG. 6 is a simplified block diagram of an example SR domain illustrating operation of a system for supporting loop detection and avoidance for SR-TE paths may be implemented in accordance with embodiments described herein.

Routes(D):
External Traffic (e.g. IP-to-MPLS (D)):
outgoing path tunnel T
Internal Traffic (e.g. MPLS-to-MPLS (D)):
outgoing path as determined by IGP Referring to FIG. 6, in accordance with features of embodiments described herein, when external packets (e.g. IP) arrive from the external customer interface at node A, as represented by an arrow designated by a reference numeral 60, they are tunneled into SR tunnel T with segment list {B, D}. When a link failure 61 occurs on link B-C, node B forwards packets destined to node D via node A with the top label for segment D. MPLS packets arriving on node A from node B whose top label is for segment D, as represented by an arrow designated by a reference numeral 62, will match the MPLS-to-MPLS internal traffic route in the FIB of node A and will not be tunneled into SR-TE tunnel T; instead, those packets will be routed via the IGP-computed shortest path to node D (i.e., via node E southbound), as represented by an arrow designated by a reference numeral 64, consequently avoid the looping problem previously illustrated in and described with reference to FIG. 6. It will be noted that the same logic may be applied to external MPLS traffic provided that the MPLS traffic is categorized as external. This may be achieved by using the Traffic Matrix as a boundary for categorizing SR-TE external/internal boundary. In summary, external traffic arriving at ingress node A will be routed on an outgoing path comprising tunnel T; internal traffic arriving at ingress node A will be routed on an outgoing path as determined by IGP (in this case, via node E).

The list of SR segments that are imposed on packets constitutes the TE path to be followed from the ingress toward the destination. As previously described, the path of an individual prefix SID segment of the SR-TE path segment list may, under certain conditions, loop back to the ingress node. It will be recognized that this may happen if the SR-TE path is computed using a stale topology or due to a change to the individual segment path(s) after a network event. Referring to FIG. 5, assuming the SR path {B, D} for a packet from node A to node D is initially valid and packets are routed northbound along the path A-B-C-D. When link B-C fails, the path become looping between node A and node B, as described with reference to FIG. 5. As illustrated in and described with reference to FIG. 6, the indefinite packet loop may be avoided using the mechanism described herein; however, customer packets will still travel a suboptimal path (A-B-A-E-D). Similarly, if the original SR-TE path were {C-D} and the link B-C were to fail, customer packets would travel a path {A-B-A-E-D-C-D}. A path loop detection scheme described in greater detail below avoids routing the packets on this suboptimal path. In accordance with features of embodiments described herein, a control plane path loop detection mechanism is provided to avoid such a sub-optimal state. The control plane path loop detection mechanism may be implemented at the PCE, where the path is produced, or may be distributed. The mechanism is a loop detection validation scheme against the set of segments that constitute the SR-TE path. For example, a PCE may withdraw a previously announced path to a PCC if looping s detected in the path. Using the mechanism, the SR-TE headend can detect that a suboptimal path state exists and take the proper action (e.g., by recomputing a new optimal path based on the updated topology or by using another precomputed path).

The loop detection mechanism constitutes recursively computing the shortest path, starting from the tunnel headend, to the next SR segment endpoint of the SR-TE path and validating that the shortest path does not traverse the tunnel headend. For purposes of example, it will be assumed that a path, or tunnel T, comprises a set of segments S={SID1, SID2, SID3, . . . SIDn}.

Figure 7:
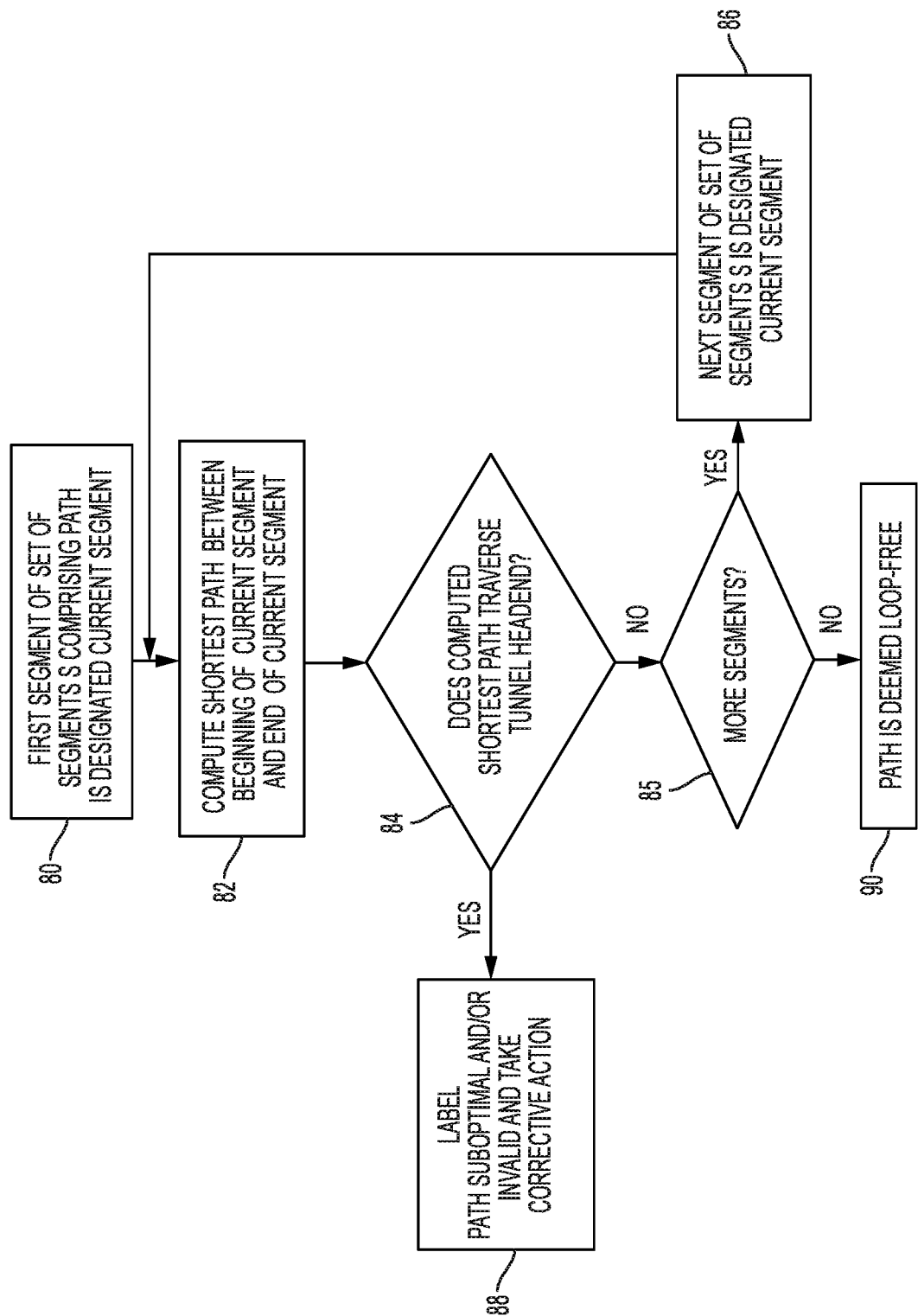
FIG. 7 is a simplified flowchart illustrating example operational steps that may be associated with a system for supporting loop detection and avoidance for SR-TE paths may be implemented in accordance with embodiments described herein.

FIG. 7 is a flowchart illustrating a path loop detection algorithm in accordance with embodiments described herein. In step 80, the first segment is the set of segments S is deemed the current segment and in step 82, the shortest path between the beginning of the current segment and the end of the current segment is computed. In step 84, a determination is made whether path computed in step 82 traverses the headend of the tunnel. If not, execution proceeds to step 85, in which a determination is made whether there are more segments in the set S. If it is determined that there are more segments in the set S, execution proceeds to step 86, in which the next segment in the set of segments S is deemed the current segment and execution returns to step 82. If it is determined in step 84 that the path computed in step 82 traverses the headend of the tunnel, execution proceeds to step 88, in which the path comprising the tunnel T is labeled suboptimal or invalid, at which point corrective action (i.e., computing a new optimal path) is taken. If it is determined in step 85 that there are no more segments in the set S, execution proceeds to step 90, in which the path is deemed is deemed not looping to ingress.

In example implementations, at least some portions of the activities related to the embodiments described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

For example, referring again to FIG. 4, PCE server 42 may include a loop detection and avoidance ("LDA") module 100 comprising software embodied in one or more tangible media for facilitating the activities described herein. In particular, the LDA module 100 comprises software for facilitating the processes illustrated in and described with reference to FIG. 8. The PCE server 42 may also include a memory device 101 for storing information to be used in achieving the functions as outlined herein. Additionally, the PCE server 42 may include a processor 102 that is capable of executing software or an algorithm (such as embodied in module 100) to perform the functions as discussed in this Specification, as well as one or more I/O devices, collectively designated in FIG. 4 by a reference numeral 103.

As previously noted, the PCE server 42 is communicatively coupled to at least one SR node, such as SR node 40, which may be implemented as a router. As illustrated in FIG. 4, SR node 40 may include a route installation module 104 comprising software embodied in one or more tangible media for facilitating the activities described herein. In particular, the route installation module 104 comprises software for installing routes in a FIB 105 stored in a memory device 106 of SR node 40 as computed by PCE 42 and communicated to SR node 40. The memory device 106 may also store additional information to be used in achieving the functions as outlined herein. Additionally, the SR node 40 may include a processor 108 that is capable of executing software or an algorithm (such as embodied in module 104) to perform the functions as discussed in this Specification, as well as one or more I/O devices, collectively designated in FIG. 4 by a reference numeral 109.

It will be recognized that the SR node 40 and PCE server 42 of FIG. 4 may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIGS. 5 and 6. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIG. 7 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 8 and 9. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 8:
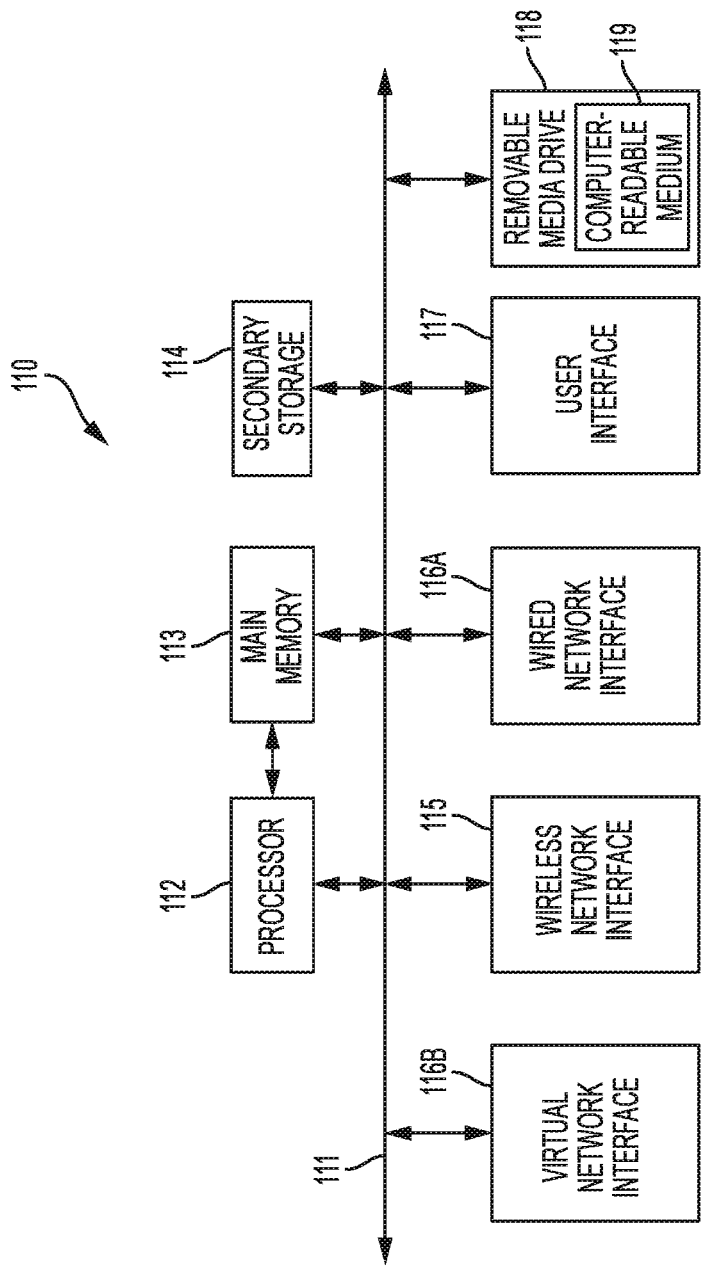
FIG. 8 is a simplified block diagram illustrating components of an example machine capable of executing instructions in a processor in a system for implementing various features of embodiments described herein.

Turning to FIG. 8, illustrated therein is a simplified block diagram of an example machine (or apparatus) 110, which in certain embodiments may comprise an SR router, such as SR node 40, or a server, such as PCE server 42, that may be implemented in embodiments illustrated in and described with reference to the FIGURES provided herein. The example machine 110 corresponds to network elements and computing devices that may be deployed in environments illustrated in described herein. In particular, FIG. 8 illustrates a block diagram representation of an example form of a machine within which software and hardware cause machine 110 to perform any one or more of the activities or operations discussed herein. As shown in FIG. 8, machine 110 may include a processor 112, a main memory 113, secondary storage 114, a wireless network interface 115, a wired network interface 116A, a virtual network interface 116B, a user interface 117, and a removable media drive 118 including a computer-readable medium 119. A bus 111, such as a system bus and a memory bus, may provide electronic communication between processor 112 and the memory, drives, interfaces, and other components of machine 110. Machine 110 may be a physical or a virtual appliance, for example a virtual router running on a hypervisor or running within a container.

Processor 112, which may also be referred to as a central processing unit ("CPU"), can include any general or special-purpose processor capable of executing machine readable instructions and performing operations on data as instructed by the machine readable instructions. Main memory 113 may be directly accessible to processor 112 for accessing machine instructions and may be in the form of random access memory ("RAM") or any type of dynamic storage (e.g., dynamic random access memory ("DRAM")). Secondary storage 114 can be any non-volatile memory such as a hard disk, which is capable of storing electronic data including executable software files. Externally stored electronic data may be provided to computer 110 through one or more removable media drives 118, which may be configured to receive any type of external media such as compact discs ("CDs"), digital video discs ("DVDs"), flash drives, external hard drives, etc.

Wireless, wired, and virtual network interfaces 115, 116A and 116B can be provided to enable electronic communication between machine 110 and other machines or nodes via networks (e.g., networks 14, 84). In one example, wireless network interface 115 could include a wireless network controller ("WNIC") with suitable transmitting and receiving components, such as transceivers, for wirelessly communicating within a network. Wired network interface 116A can enable machine 110 to physically connect to a network by a wire line such as an Ethernet cable. Both wireless and wired network interfaces 115 and 116A may be configured to facilitate communications using suitable communication protocols such as, for example, Internet Protocol Suite ("TCP/IP"). Machine 110 is shown with both wireless and wired network interfaces 115 and 116A for illustrative purposes only. While one or more wireless and hardwire interfaces may be provided in machine 110, or externally connected to machine 110, only one connection option is needed to enable connection of machine 110 to a network.

A user interface 117 may be provided in some machines to allow a user to interact with the machine 110. User interface 117 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, and an application programming interface (API), etc.

Removable media drive 118 represents a drive configured to receive any type of external computer-readable media (e.g., computer-readable medium 119). Instructions embodying the activities or functions described herein may be stored on one or more external computer-readable media. Additionally, such instructions may also, or alternatively, reside at least partially within a memory element (e.g., in main memory 113 or cache memory of processor 112) of machine 110 during execution, or within a non-volatile memory element (e.g., secondary storage 114) of machine 110. Accordingly, other memory elements of machine 110 also constitute computer-readable media. Thus, "computer-readable medium" is meant to include any medium that is capable of storing instructions for execution by machine 110 that cause the machine to perform any one or more of the activities disclosed herein.

Not shown in FIG. 8 is additional hardware that may be suitably coupled to processor 112 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 110 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 110 to appropriately manage the operation of the hardware components therein.

The elements, shown and/or described with reference to machine 110, are intended for illustrative purposes and are not meant to imply architectural limitations of machines such as those utilized in accordance with the present disclosure. In addition, each machine, may include more or fewer components where appropriate and based on particular needs and may run as virtual machines or virtual appliances. As used herein in this Specification, the term "machine" is meant to encompass any computing device or network element such as servers, virtual servers, logical containers, routers, personal computers, client computers, network appliances, switches, bridges, gateways, processors, load balancers, wireless LAN controllers, firewalls, or any other suitable device, component, element, or object operable to affect or process electronic information in a network environment.

In one example implementation, SR nodes, such as SR node 40, and PCE server 42 are network elements or computing devices, which may be implemented as physical and/or virtual devices and may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 113, secondary storage 114, computer-readable medium 119) can store data used for the various operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 112) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of network environment 10 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environments described herein could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that embodiments described herein, as shown in the FIGURES, and teachings thereof are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    obtaining a packet of a traffic flow at an ingress node of a communications network;
    calculating a shortest path between a beginning of a current segment of a tunnel associated with a first segment-switched path and an end of the current segment;
    routing the packet to an egress node of the communications network via either the first segment-switched path or a second segment-switched path different than the first segment-switched path depending on whether the packet was obtained from a first node external to the communications network or from a second node internal to the communications network;
    determining whether or not the shortest path traverses a head end of the tunnel; and
    using either the tunnel or a different tunnel to implement the first segment-switched path depending on whether the shortest path traverses the head end of the tunnel.

2. The method of claim 1, wherein the first segment-switched path is identified by a first Forwarding Information Base ("FIB") entry corresponding to the traffic flow and wherein the second segment-switched path is identified by a second FIB entry corresponding to the traffic flow.

3. The method of claim 2, wherein the first FIB entry is for external Internet Protocol (IP)-to-Multi-protocol Label Switching (MPLS) traffic and the second FIB entry is for internal MPLS-to-MPLS traffic.

4. The method of claim 1, further comprising, if the tunnel is deemed suboptimal, taking corrective action with respect to the tunnel.

5. The method of claim 1, further comprising if it is determined that the shortest path does not traverse the head end of the tunnel:
    identifying a next segment of the tunnel;
    calculating for the next segment a shortest path between a beginning of the next segment and an end of the next segment; and
    determining whether the shortest path calculated for the next segment traverses the head end of the tunnel.

6. The method of claim 5, further comprising, if it is determined that the shortest path calculated for the next segment traverses the head end of the tunnel, deeming the tunnel suboptimal and using another tunnel to implement the first segment-switched path.

7. The method of claim 5, wherein the tunnel comprises a plurality of additional segments, and the method further comprising:
- for each of the additional segments:
  - calculating for the additional segment a shortest path between a beginning of the additional segment and an end of the additional segment;
  - determining whether the shortest path calculated for the additional segment traverses the head end of the tunnel; and
  - if none of the shortest paths calculated for the current segment and each of the additional segments traverses the head end of the tunnel, deeming the tunnel non-looping.

8. The method of claim 1, wherein the tunnel is a segment routing traffic engineering ("SR-TE") tunnel.

9. One or more non-transitory tangible media that includes code for execution and when executed by a processor is operable to perform operations comprising:
- obtaining a packet of a traffic flow at an ingress node of a communications network;
- calculating a shortest path between a beginning of a current segment of a tunnel associated with a first segment-switched path and an end of the current segment;
- routing the packet to an egress node of the communications network via either the first segment-switched path or a second segment-switched path different than the first segment-switched path depending on whether the packet was obtained from a first node external to the communications network or from a second node internal to the communications network;
- determining whether or not the shortest path traverses a head end of the tunnel; and
- using either the tunnel or a different tunnel to implement the first segment-switched path depending on whether the shortest path traverses the head end of the tunnel.

10. The media of claim 9, wherein the first segment-switched path is identified by a first Forwarding Information Base ("FIB") entry corresponding to the traffic flow and wherein the second segment-switched path is identified by a second FIB entry corresponding to the traffic flow.

11. The media of claim 10, wherein the first FIB entry is for external Internet Protocol (IP)-to-Multi-protocol Label Switching (MPLS) traffic and the second FIB entry is for internal MPLS-to-MPLS traffic.

12. The media of claim 9, wherein the operations further include if it is determined that the shortest path does not traverse the head end of the tunnel:
- identifying a next segment of the tunnel;
- calculating for the next segment a shortest path between a beginning of the next segment and an end of the next segment; and
- determining whether the shortest path calculated for the next segment traverses the head end of the tunnel.

13. The media of claim 12, wherein the tunnel comprises a plurality of additional segments, the operations further comprising:
- for each of the additional segments:
  - calculating for the additional segment a shortest path between a beginning of the additional segment and an end of the additional segment;
  - determining whether the shortest path calculated for the additional segment traverses the head end of the tunnel; and
  - if none of the shortest paths calculated for the current segment and each of the additional segments traverses the head end of the tunnel, deeming the tunnel non-looping.

14. An apparatus comprising:
- a memory configured to store data;
- a network interface configured to enable communications over a communications network;
- a processor operable to execute instructions associated with the data, wherein the processor is operable to:
  - obtain a packet of a traffic flow at an ingress node of the communications network;
  - calculate a shortest path between a beginning of a current segment of a tunnel associated with a first segment-switched path and an end of the current segment;
  - route the packet to an egress node of the communications network via either the first segment-switched path or a second segment-switched path different than the first segment-switched path depending on whether the packet was obtained from a first node external to the communications network or from a second node internal to the communications network;
  - determine whether or not the shortest path traverses a head end of the tunnel; and
  - use either the tunnel or a different tunnel to implement the first segment-switched path depending on whether the shortest path traverses the head end of the tunnel.

15. The apparatus of claim 14, wherein the first segment-switched path is identified by a first Forwarding Information Base ("FIB") entry corresponding to the traffic flow and wherein the second segment-switched path is identified by a second FIB entry corresponding to the traffic flow.

16. The apparatus of claim 15, wherein the first FIB entry is for external Internet Protocol (IP)-to-Multi-protocol Label Switching (MPLS) traffic and the second FIB entry is for internal MPLS-to-MPLS traffic.

17. The apparatus of claim 15, wherein the processor is configured to, if it is determined that the shortest path does not traverse the head end of the tunnel:
- identify a next segment of the tunnel;
- calculate for the next segment a shortest path between a beginning of the next segment and an end of the next segment; and
- determine whether the shortest path calculated for the next segment traverses the head end of the tunnel.

18. The apparatus of claim 17, wherein the tunnel comprises a plurality of additional segments, the processor is further operable to:
- for each of the additional segments:
  - calculate for the additional segment a shortest path between a beginning of the additional segment and an end of the additional segment;
  - determine whether the shortest path calculated for the additional segment traverses the head end of the tunnel; and
  - if none of the shortest paths calculated for the current segment and each of the additional segments traverses the head end of the tunnel, deem the tunnel non-looping.

19. The method of claim 1, further comprising:
- determining whether the shortest path is deemed looping to the ingress node based on whether the shortest path is determined to traverse the head end of the tunnel.

20. The method of claim 1, wherein using either the tunnel or the different tunnel to implement the first segment-switched path includes:
 using the tunnel based on determining that the shortest path does not traverse the head end of the tunnel; and
 using the different tunnel based on determining that the shortest path traverses the head end of the tunnel.

\* \* \* \* \*